No. 802,944. PATENTED OCT. 24, 1905.
I. G. WATERMAN.
MECHANICAL PUSH BUTTON VALVE.
APPLICATION FILED JUNE 2, 1903.
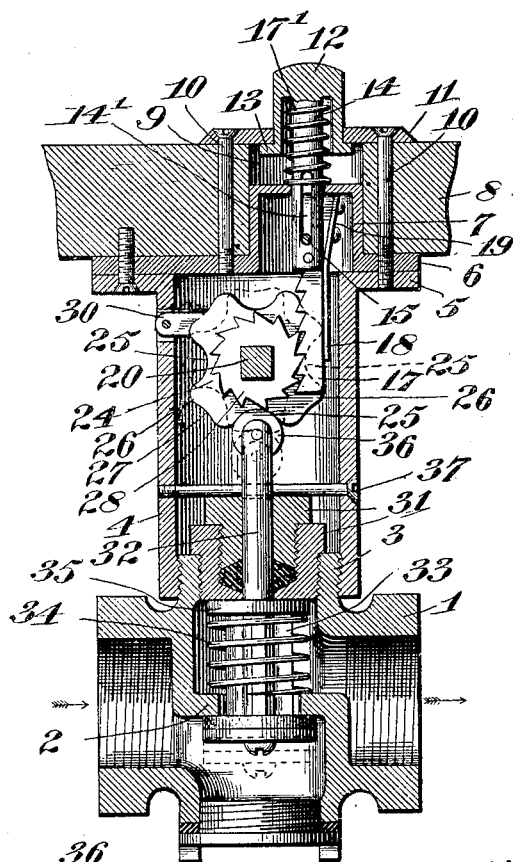
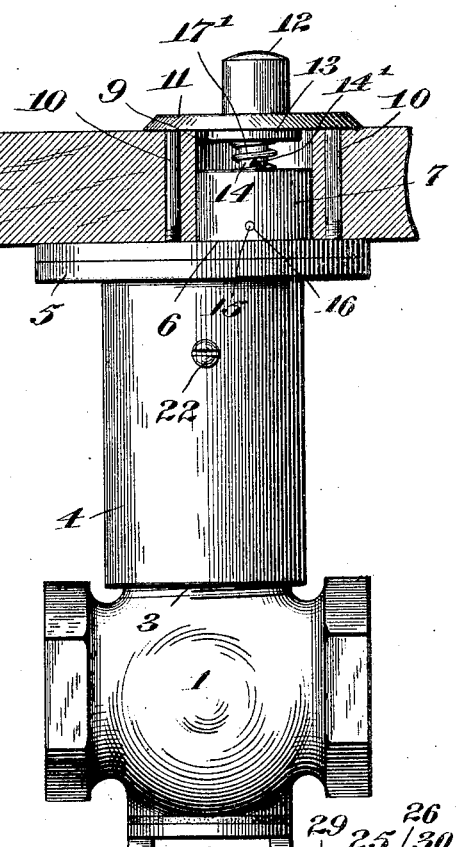
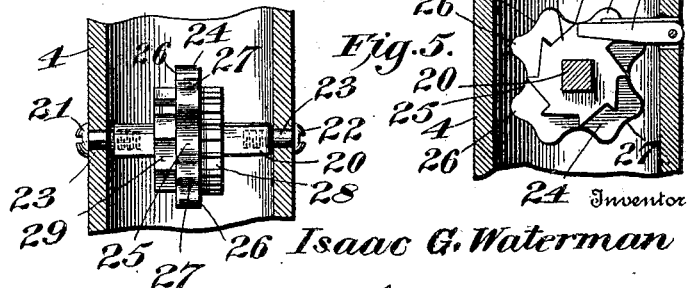
Witnesses
Elmer Leavey
Wallace R. Leavey
Inventor
Isaac G. Waterman
By
Geo. A. Hamlin
Attorney

UNITED STATES PATENT OFFICE.

ISAAC G. WATERMAN, OF SANTA BARBARA, CALIFORNIA.

MECHANICAL PUSH-BUTTON VALVE.

No. 802,944. Specification of Letters Patent. Patented Oct. 24, 1905.

Application filed June 2, 1903. Serial No. 159,806.

*To all whom it may concern:*

Be it known that I, ISAAC G. WATERMAN, a citizen of the United States, residing at Santa Barbara, in the county of Santa Barbara and State of California, have invented new and useful Improvements in Mechanical Push-Button Valves, of which the following is a specification.

My invention relates to mechanical push-button valves.

The object of the present invention is to provide an improved, simple, inexpensive, and reliable mechanical push-button mechanism for opening and closing valves to control the flow of water or other fluids at bath-tubs, lavatories, or other places which will operate positively to alternately open and close the valve on alternate operations of the push-button by hand.

My invention comprises certain improved features and novel combinations of elements set forth fully hereinafter and embodied in the appended claims.

In the accompanying drawings, Figure 1 is a sectional elevation with certain parts in full lines of my complete invention; Fig. 2, a side elevation thereof; Fig. 3, a detail of the cam-wheel and the ratchet-wheels; Fig. 4, a detail of the upper part of the valve-stem and guiding-pin, and Fig. 5 a detail of the locking ratchet-wheel and pawl.

Referring first to Figs. 1, 2, 3, 4, and 5, the valve shell or casing 1 has the usual seat 2, the water flowing in the direction indicated by the arrows. Screwed onto the usual coupling 3 on the valve-shell is a tubular casing 4, having a flanged head 5, matching a cap 6, which has an integral inverted cup 7. As one of the principal uses of this valve is in controlling the water-flow to baths and lavatories, I have shown how it can be used in connection with the usual marble slab 8, which constitutes a facing for the wall. In fastening the device to the slab a hole 9 is made to receive the cup to the slab 7, and the cap is fastened to the slab and to the flanged head by the fastenings 10, which also pass through a push-button face-plate 11, through which projects a push-button 12, having a flange 13 to limit its outward movement. The push-button has a stem 14 working through the cup 7 and guided in its reciprocations by a transverse pin 15 in a slot 14' and whose ends are received in diametrically-disposed openings 16 in the cup 7, thereby preventing turning of the stem. A coil-spring 17', surrounding the stem 14, is interposed between the cup 7 and face 11. Pivoted or hinged to the end of the stem 14 is a toothed bar or rack 17, whose teeth have abrupt shoulders. A leaf-spring 18, connected to the stem 14 at 19, has its free end bearing on the rack or bar 17.

Extending transversely of the casing 4 is a square shaft 20, into the ends of which are screwed screws 21 and 22, which have blank or smooth portions 23, journaled in the walls of the casing. On this shaft is fixed a cam-wheel 24 of the general shape of a cross, provided with the four rounded notches 25 and the arms 26, which have rounded notches 27 in the ends. Secured on the shaft 20 beside the cam-wheel is a ratchet-wheel 28, with which the rack or bar 17 is made to engage by the pressure of spring 18. Secured on the shaft 20 is another ratchet-wheel 29, having eight teeth and which is engaged by a pawl or dog 30 on the casing 4, which prevents backward rotation of the shaft and cam-wheel.

Into the coupling 3 screw the glands 31. Slidable through the glands 31 is the valve-stem 32 of a valve 33, which is adapted to close against the bottom of the seat 2 by the action of the spring 34, interposed between the seat and a collar 35 on the stem 32. The upper end of the stem 32 carries a wheel or roller 36, adapted to bear against a periphery of the cam-wheel and to engage the notches therein according to the position of the cam-wheel, whereby the valve is either opened or closed. The end of the valve-stem 32 is bifurcated for quite a distance and extending therethrough is a pin or screw 37, which prevents turning of the valve-stem.

Normally the parts are in the position shown in Fig. 1, the valve being closed. When the button 12 is pushed in until it strikes the cup 7, the toothed bar or rack 17 by its engagement with the ratchet-wheel 28 turns the shaft and cam-wheel 24 an eighth of a revolution, where it is locked by the engagement of pawl or dog 30 with ratchet-wheel 29. In turning the wheel 36 passes out of the notch 25 and into the notch 27 at the end of the adjacent arm 26, thereby depressing the valve-stem and unseating the valve, as shown by dotted lines in Fig. 1. On releasing the push-button the valve remains open, and the spring 17' returns the push-button, stem, and toothed bar to normal position, the spring 18 permitting the toothed bar to ride back idly over the ratchet-wheel 28. When the push-button is again pushed in, the wheel 36 passes from the notch 27 and the spring 34 closes the valve and snaps the roller 36 into the succeeding notch 25. The push-button and toothed bar return automatically when released as before. Alternate depressions of the push-button open and close the valve.

In a divisional application filed January 12, 1904, Serial No. 188,783, I have disclosed a rotary valve operated from an independent spring-retracted push-button by a pawl and ratchet-wheel mechanism.

Having thus described my invention, what I claim as new, and desire to secure by Letters Patent, is—

1. The combination with a self-closing valve adapted to automatically close when released, of a cam coöperating with the valve and adapted to hold the valve open, and an independent spring-retracted push-button for operating the cam to open and close the valve.

2. The combination with a valve, of a valve-stem, a rotary cam having raised portions and depressions arranged in alternation and adapted to engage the valve-stem, a ratchet-wheel for turning said cam, an independent spring-retracted push-button, a toothed member hinged to the push-button, and a spring for holding the toothed member in engagement with the ratchet-wheel, whereby on one movement of the push-button the toothed member engages and turns the ratchet-wheel, and on the other movement of the push-button the toothed member rides idly on the ratchet-wheel.

3. The combination with a self-closing valve, of an independently-movable spring-retracted push-button limited to a predetermined play or reciprocation and mechanically coöperating with the valve to open said valve once only on each complete reciprocation or cycle of movement.

4. The combination with a self-closing valve, of a member coöperating therewith to hold the valve open and an independently-movable spring-retracted push-button limited to a predetermined play or reciprocation and mechanically coöperating with valve-holding member to open the valve once only on one complete reciprocation or cycle of movement, and to release the valve on a succeeding complete reciprocation or cycle of movement.

In testimony whereof I have signed my name to this specification in the presence of two subscribing witnesses.

ISAAC G. WATERMAN. [L. S.]

Witnesses:
ELMER SEAVERY,
GEO. C. BURBANK.